United States Patent
Bohn et al.

(10) Patent No.: US 6,967,723 B2
(45) Date of Patent: *Nov. 22, 2005

(54) INTERFEROMETRIC MEASURING DEVICE

(75) Inventors: Gunther Bohn, Ludwigsburg (DE); Martin Berger, Pleidelsheim (DE); Jochen Straehle, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

This patent is subject to a terminal disclaimer.

(21) Appl. No.: 10/355,428

(22) Filed: Jan. 31, 2003

(65) Prior Publication Data
US 2003/0231314 A1 Dec. 18, 2003

(30) Foreign Application Priority Data
Feb. 1, 2002 (DE) .............................. 102 04 136

(51) Int. Cl.⁷ .......................... G01B 9/02; G01N 21/00
(52) U.S. Cl. .................... 356/511; 356/512; 356/241.1
(58) Field of Search ................... 356/489, 495, 356/511, 512, 241.1, 601, 602

(56) References Cited

U.S. PATENT DOCUMENTS

| | | | |
|---|---|---|---|
| 4,898,470 A * | 2/1990 | Cleaveland | 356/513 |
| 5,004,339 A * | 4/1991 | Pryor et al. | 356/241.1 |
| 5,933,231 A * | 8/1999 | Bieman et al. | 356/241.1 |
| 6,154,279 A * | 11/2000 | Thayer | 356/602 |
| 6,714,307 B2 * | 3/2004 | De Groot et al. | 356/512 |
| 6,822,746 B2 * | 11/2004 | Prinzhausen et al. | 356/497 |
| 2003/0048532 A1 * | 3/2003 | Lidner et al. | 359/511 |

FOREIGN PATENT DOCUMENTS

| | | | | |
|---|---|---|---|---|
| DE | 100 39 239 A1 * | 3/2002 | | G01B 9/02 |
| DE | 101 31 778 A1 * | 1/2003 | | G01B 9/02 |

* cited by examiner

Primary Examiner—Zandra V. Smith
Assistant Examiner—Patrick Connolly
(74) Attorney, Agent, or Firm—Kenyon & Kenyon

(57) ABSTRACT

An interferometric measuring device includes a reference arm having a reference surface and a measuring arm having lighting optics for deflecting measuring light onto a measuring surface of an object to be measured, and having an image recorder connected to an analyzing device. A rapid, simple measurement with a rugged design of the measuring device may be achieved by configuring the lighting optics as a light guide body insertable into a cavity in the object to be measured, having a peripheral, radially symmetrical effective reflex surface directed radially or obliquely outward, and also including at least one deflector surface deflecting the measuring light onto same.

7 Claims, 1 Drawing Sheet

INTERFEROMETRIC MEASURING DEVICE

CROSS-REFERENCE TO RELATED APPLICATIONS

The present application claims priority from Application No. 102 04 136.9, filed in the Federal Republic of Germany on Feb. 1, 2002, which is expressly incorporated herein by reference thereto.

FIELD OF THE INVENTION

The present invention relates to an interferometric measuring device having a reference arm having a reference surface and a measuring arm having lighting optics for deflecting measuring light onto a measuring surface of an object to be measured, and having an image recorder connected to an analyzing device.

BACKGROUND INFORMATION

Interferometric measuring devices perform measurements in tight cavities, for example, where a bundled measuring light is directed by suitable lighting optics onto an area of an inner surface, which is scanned, e.g., by moving a reference mirror in the direction of the reference arm. However, the area of the inner surface included in this scanning is relatively small. With such a measurement, it is also not easy to accurately determine the measurement point relative to the object. If such a measuring device is to be used in manufacturing, there may be disadvantages due to the measurement complexity.

Conventionally, to measure seat surfaces in valve-seat members, mechanical scanning devices have been used to scan the seat surface and/or the sealing area thereof, e.g., by rotating the valve-seat member. The roundness of the seat surface is determined from the scanning results and a good/bad evaluation is performed.

SUMMARY

It is an object of the present invention to provide an interferometric measuring device with which it is possible to measure surfaces in tight spaces with the least possible effort, while achieving a high measurement accuracy.

The above and other beneficial objects of the present invention are achieved by providing an interferometric measuring device as described herein.

This object may be achieved when the lighting optics are configured as a light guide body including a peripheral, radially symmetrical effective reflex surface directed radially or obliquely outwardly and including at least one deflector surface deflecting the measuring light onto same.

With this example embodiment of the lighting optics, it is possible for the measuring surface to be guided rapidly and easily without a relative movement of the lighting optics. It may be sufficient to position the lighting optics once on the object to be measured.

An accurate measurement may be achieved by adapting the effective reflex surface to the cross-sectional shape of the measuring surface while maintaining a uniform distance from the same and achieving a perpendicular incidence of the measuring light onto the same, and by tailoring the at least one deflector surface to the effective reflex surface such that the measuring light is deflected perpendicularly onto the same.

In an exemplary embodiment of the light guide body, the deflector surface is configured as a conical surface directed in an opposite direction from the direction of incidence of the measuring light, and the effective reflex surface is configured as a conical surface directed in the direction of incidence of the measuring light.

To be able to perform measurements easily and quickly in the same way in fabrication, for example, it may be provided that the light guide body has a protruding edge directed perpendicular to the measuring arm, the distance of this edge from the effective reflex surface being such that the effective reflex surface is at a distance from the measuring surface when, in the inserted state, the edge is in contact with a facing opening edge of the object to be measured, or the light guide body has a base surface, directed perpendicular to the measuring arm, which is such a distance from the effective reflex surface that the effective reflex surface is a distance away from the measuring surface when, in the inserted state, the base surface is in contact with a ground area of the object to be measured. These measures may yield a defined positioning of the lighting optics during the measurement.

Another exemplary embodiment for a rapid accurate measurement involves the analyzing device having an analyzing unit with which the interference data obtained by depth scanning of the measuring surface is analyzed to determine whether the measuring surface is round.

An application, which may also be favorable for testing purposes during a production process in particular, involves measuring a valve-seat surface as the measuring surface in a valve-seat member.

The present invention is explained in greater detail below on the basis of exemplary embodiments with reference to the drawings.

DETAILED DESCRIPTION

Figure 1:
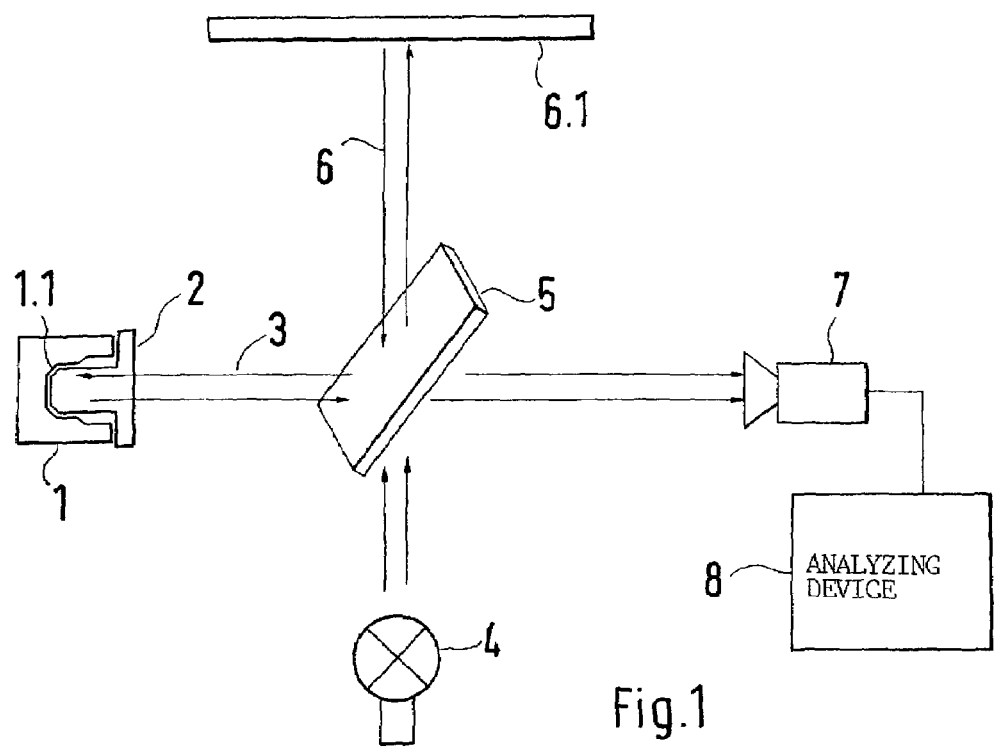
FIG. 1 is a schematic view of an interferometric measuring device having special lighting optics.

FIG. 1 illustrates an interferometric measuring device having a light source 4, the emitted light of which is split by a beam splitter 5 into a reference arm 6 having a reference mirror 6.1 and a measuring arm 3 having a lighting optics in it in the form of a light guide body 2. With corresponding optical path lengths of reference arm 6 and measuring arm 3, the light beams coming back from reference mirror 6.1 and an object to be measured form interference and reach the image pick-up of a camera 7, which is connected to an analyzing device 8 to determine the surface structure of a measuring surface 1.1 of the object to be measured from the interference data. To scan measuring surface 1.1 in the depth direction, the optical path length of reference arm 6 is moved relative to the optical path length of measuring arm 3, e.g., by moving reference mirror 6.1 in the direction of the reference arm (depth scanning, depth scan).

Figure 2:
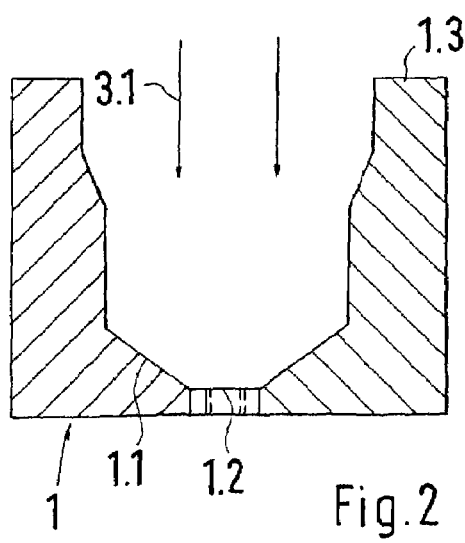
FIG. 2 is a cross-sectional view of an object to be measured having a cavity.
Figure 3:
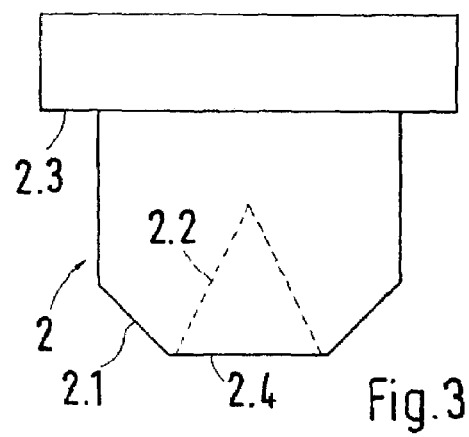
FIG. 3 illustrates an exemplary embodiment of lighting optics.
Figure 4:
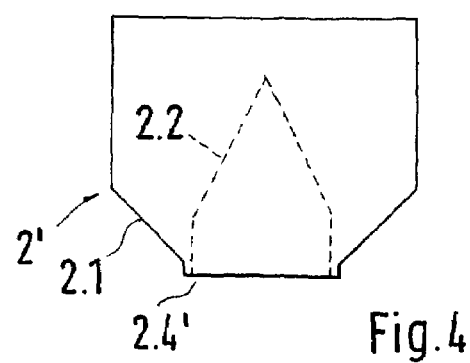
FIG. 4 illustrates another exemplary embodiment of lighting optics.

In the present case, a peripheral measuring surface 1.1, in the form of a valve-seat surface 1.1 of a valve-seat member (valve seat) 1 directed obliquely to the incident light direction of measuring arm 3, is to be scanned, as illustrated in FIG. 2. To do so, measuring light 3.1 of measuring arm 3 is deflected normal to seat surface 1.1 by special lighting optics in the form of a one-piece light guide body 2, 2' as illustrated in FIGS. 3 and 4, this seat surface usually forming only a narrow peripheral strip of the inclined surface illustrated in FIG. 2. In this manner, the entire radially symmetrical, peripheral seat surface 1.1 is simultaneously illuminated and scanned, i.e., measured. In particular, this may make it possible to determine easily and rapidly whether seat surface 1.1 has the required roundness by determining the resulting interference data in depth scanning to detect deviations in height with respect to the measured ring striations in the peripheral direction relative to an ideal circle and derive a good/bad evaluation of seat surface 1.1 on the basis of the resulting deviations.

For lighting seat surface 1.1 and scanning it, measuring light 3.1 is deflected obliquely outward over light guide body 2, 2' relative to the axis of measuring arm 3, so that the light is guided perpendicularly through an effective reflex surface 2.1 and strikes seat surface 1.1 at a right angle. The seat surface is inclined according to effective reflex surface 2.1 or it may also have a concave or convex curvature according to seat surface 1.1. Light guide body 2, 2' has a conical surface as deflector surface 2.2 opposite the direction of incidence of measuring light 3.1 to deflect measuring light 3.1. The conical surface may be introduced from the underside of light guide body 2, 2' facing away from measuring light 3.1 by using a corresponding conical bore. As illustrated in FIG. 4, a cylindrical section is introduced toward the underside, i.e., toward the open side, with the conical surface adjoining this cylindrical section. For deflecting or controlling the light, effective reflex surface 2.1 and deflector surface 2.2 may also have a suitable coating. When light guide body 2, 2' is inserted into valve-seat member 1, effective reflex surface 2.1 is a uniform distance away from valve-seat surface 1.1 all the way around. This distance is maintained definitively due to the fact that light guide body 2 illustrated in FIG. 3 comes to rest at an upper protruding collar-like edge 2.3 on an opening edge 1.3 of valve-seat member 1 pointing in the direction of incidence of the light. As an alternative, as illustrated in FIG. 4, a base surface 2.4' may be spaced at a distance from seat surface 1.1 such that the desired distance of effective reflex surface 2.1 is maintained when base surface 2.4' comes in contact with a ground area 1.2 in the cavity of valve-seat member 1.

For scanning seat surface 1.1, light guide body 2, 2' thus may need only to be inserted into valve-seat member 1, while the measurement is performed without a change in position of light guide body 2, 2' relative to valve-seat member 1 over its entire ring surface. It is thus possible to detect depth deviations perpendicular to seat surface 1.1 by analyzing the interference data in scanning relative to the adjacent areas of seat surface 1.1 in the circumferential direction by using the image recorder, i.e., camera 7 and analyzing device 8 connected to the former. The roundness of seat surface 1.1 may be determined from this data and a good/bad evaluation may be performed.

Due to the essentially perpendicular deflection of the light onto seat surface 1.1, the area of interest is essentially imaged as a planar structure, so that an accurate measurement is possible. One-piece light guide body 2, 2' made of an optically transparent material and its simple use may yield a rugged measurement arrangement which may also be used in production in particular. Light guide body 2, 2' may be designed with rotational symmetry. The beams of light directed perpendicularly through effective reflex surface 2.1 onto measuring surface 1.1 are reflected back at a right angle accordingly and also enter effective reflex surface 2.1 again at a right angle, after which they are reflected back by deflector surface 2.2 in the direction opposite the direction of incidence, so that it is possible to generate an adequate intensity for the analysis in evaluation and determination of a data record for the three-dimensional measurement. The surfaces, i.e., interfaces of light guide body 2, 2', may be finished with a suitable thin layer. Light guide body 2, 2' may be adapted to various internal surfaces 1.1 to be measured on objects 1 to be measured, e.g., by positioning effective reflex surface 2.1 and the at least one deflector surface 2.2 accordingly to achieve a perpendicular lighting of measuring surface 1.1 and to create a planar image.

What is claimed is:

1. An interferometric measuring device, comprising:
   a reference arm having a reference surface;
   a measuring arm having lighting optics configured to focus measuring light onto a measuring surface of an object to be measured; and
   an image recorder connected to an analyzing device;
   wherein the lighting optics include a light guide body insertable into a cavity in the object to be measured having a peripheral, radially symmetrical effective reflex surface directed one of radially and obliquely outwardly and having at least one deflector surface configured to direct the measuring light onto the object.

2. The measuring device according to claim 1, wherein the effective reflex surface is adapted to a cross-sectional shape of the measuring surface and maintains a uniform distance from the measuring surface to achieve a perpendicular incidence of the measuring light onto the measuring surface, the at least one deflector surface adapted to the effective reflex surface such that the measuring light is directed perpendicularly onto the reflex surface.

3. The measuring device according to claim 1, wherein the deflector surface includes a conical surface directed in an opposite direction from a direction of incidence of the measuring light, the effective reflex surface including a conical surface directed in the direction of incidence of the measuring light.

4. The measuring device according to claim 1, wherein the light guide body includes a protruding edge directed perpendicular to the measuring arm, a distance of the protruding edge from the effective reflex surface arranged such that the effective reflex surface is at a distance from the measuring surface when, in an inserted state, the edge is in contact with a facing opening edge of the object to be measured.

5. The measuring device according to claim 1, wherein the light guide body includes a base surface directed perpendicularly to the measuring arm at a distance away from the effective reflex surface such that the effective reflex surface is a distance away from the measuring surface when, in an inserted state, the base surface is in contact with a ground area of the object to be measured.

6. The measuring device according to claim 1, wherein the analyzing device includes an analyzing unit configured to analyze interference data obtained by depth scanning of the measuring surface to determine whether the measuring surface is round.

7. A method of using an interferometric measuring device including a reference arm having a reference surface, a measuring arm having lighting optics configured to focus measuring light onto a measuring surface of an object to be measured, and an image recorder connected to an analyzing device, the lighting optics including a light guide body insertable into a cavity in the object to be measured having a peripheral, radially symmetrical effective reflex surface directed one of radially and obliquely outwardly and having at least one deflector surface configured to direct the measuring light onto the object, comprising:

measuring a valve-seat surface as the measuring surface in a valve-seat member.

* * * * *